Patented Aug. 4, 1936

2,050,122

UNITED STATES PATENT OFFICE 2,050,122

CORROSION-PREVENTING SUBSTANCE

Werner Reuss and Friedrich Weldes, Dusseldorf-Benrath, Germany, assignors to the firm Henkel & Cie. Gesellschaft mit beschränkter Haftung, Dusseldorf, Germany No Drawing. Application April 5, 1934, Serial No. 719,235. In Germany May 18, 1933

3 Claims. (Cl. 87—5)

It has previously been proposed to diminish or prevent by means of additions the corrosive action of alkali-reacting liquids, such as for example aqueous solutions of sodium hydroxide, ammonia, alkali salts such as carbonates, phosphates, metasilicates, borates, soaps, their mixtures and so forth, upon alkali-sensitive metals, more particularly aluminium, tin, their alloys and coatings (such as for example, tin plate and the like). Thus water glass or insoluble colloidal silica or alkali-chromates have been added to cleansing agents containing alkali phosphates. In the case of cleansing agents consisting mainly of alkali carbonates, the corrosion-preventing action of difficultly soluble aluminium or tin compounds is known. In this case, aluminium phosphate may be allowed to form in liquids containing alkali phosphate by the addition of soluble aluminium salts.

These corrosion-preventing agents have various disadvantages. More particularly, their effect is not equally good in the case of all alkaline liquids, nor even in regard to all alkali-sensitive metals. Water glass in the presence of large quantities of alkali loses its effectiveness by the combination of silica and conversion into metasilicate. On the other hand, with colloidal silica, clear solutions are not obtained, but deposits which in numerous cases are troublesome and render the use of such agents difficult. Chromates, in their turn, have a poisonous action and more particularly act as eczema-producing irritants upon the human skin. The known corrosion-preventing means also often fail at higher temperatures. It is true that it has already been proposed, in the case of particularly heavy requirements, for example in the treatment of tinned metal surfaces by boiling alkaline cleansing baths, to employ simultaneously additions of water glass and alkali chromates or bichromates. The use of two different agents, however, is troublesome and suffers from the disadvantages referred to hereinbefore.

We have now found that alkali-sensitive metals and alloys may be protected against the attack of even hot alkaline corrosive liquids, by the said liquids having a content of cobaltic ammines. These compounds have the great advantage that they may be employed, without other corrosion-preventing additions, to a considerably wider extent. This applies more particularly in regard to water glass which heretofore has been employed most.

In carrying out the new invention, the liquids may be mixed for example with the ready-formed cobaltic ammines. Alternatively, however, the said ammines may be allowed to form only in the treatment liquids, for example by addition of the components and by suitable treatment. Solid alkaline substances and mixtures of substances may also be added to the ammines. By dissolving these mixtures in water, cleansing liquors which do not attack metals are obtained.

In the present process, the addition of ammines which are stable to boiling has been found to be more particularly advantageous.

Suitable ammines are for example aquo-pentammino-cobaltic chloride, chloro-pentammino-cobaltic chloride, dichloro-diethylenediamino-cobaltic nitrate, trinitro-triammino-cobalt, and also ammonium-tetranitro-diammino-cobaltate and the like.

In the compounds enumerated hereinbefore, the aforesaid amines may of course be replaced by other known nitrogen-containing bases, more particularly primary and secondary amines.

Examples (1) 30 parts by weight of crystallized trisodium phosphate, 69 parts by weight of sodium metasilicate and 1 part by weight of dichloro-diethylenediamino-cobaltic nitrate are well mixed. From this mixture, 2 per cent aqueous solutions are made, which are excellently suitable for cleansing tinned vessels, tin plate and the like, it being possible to employ the solutions at temperatures up to 95° C. Organic liquids, such as milk, also do not impair the action.

It is possible to employ equally well, instead of dichloro-diethylenediamino-cobaltic nitrate, the corresponding chloride or aquopentammino-cobaltic chloride of the formula

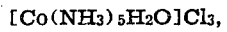

$$[Co(NH_3)_5H_2O]Cl_3,$$

and instead of the quantity of trisodium phosphate and sodium metasilicate given, equal parts of these salts may be employed.

(2) 0.6 parts by weight of ethylene-diaminohydrate are dissolved in 1000 parts by weight of a 5 per cent solution of sodium carbonate, and 1 part by weight of cobaltous chloride of the formula $CoCl_2.6H_2O$ is added thereto. A powerful stream of air is blown through this solution for some time. The solution, which may be advantageously employed for cleansing purposes, contains the cobalt in the form of a complex cobaltic ammine, and does not attack for example tin plate.

(3) 97 parts by weight of sodium metasilicate of the formula Na₂SiO₃.9H₂O are mixed with 3 parts by weight of dichloro-diethylenediamino-cobaltic chloride and then dissolved in water to form 5 per cent solutions which may be employed according to Examples 1 and 2.

(4) 48.5 parts by weight of crystallized sodium metasilicate are intimately mixed with 47 parts by weight of crystallized trisodium phosphate, 3 parts by weight of sodium tetrahydronaphthalene sulphonate, 0.75 part by weight of the compound

[Co(NH₃)₅H₂O]Cl₃ and 0.75 part by weight of dichloro-diethylene-diamino-cobaltic chloride. An excellent cleansing agent is obtained, the 2 per cent solutions of which may be employed for example at 80° to 90° C. for cleaning iron, brass and the like, without these metals being corroded.

If desired, the ammines may also be employed in admixture with other known corrosion protective agents, such as water glass and the like.

We claim:

1. The method of protecting metals against the action of alkaline-reacting liquids, which comprises providing the said liquids with a minor portion of a cobaltic ammine, the cobaltic ammine being approximately 1 to 3% of the alkaline-reacting substance.

2. The method as set forth in claim 1, in which the cobaltic ammine is a dichloro-diethylenediamino cobaltic salt.

3. A cleansing preparation comprising an alkaline detergent substance and, for the purpose of preventing corrosion of the metal article by the said alkaline detergent substance, a minor portion of a cobaltic ammine, the cobaltic ammine being approximately 1 to 3% of the mixture.

WERNER REUSS.
FRIEDRICH WELDES.